(12) United States Patent
Chen et al.

(10) Patent No.: US 8,901,765 B2
(45) Date of Patent: Dec. 2, 2014

(54) TEMPERATURE MEASURING DEVICE WITH MANUAL POWER SUPPLY

(71) Applicant: Avita Corporation, New Taipei (TW)

(72) Inventors: Chih Ming Chen, New Taipei (TW); Kuei Jing Lin, New Taipei (TW)

(73) Assignee: Avita Corporation, New Taipei (TW)

( * ) Notice: Subject to any disclaimer, the term of this patent is extended or adjusted under 35 U.S.C. 154(b) by 37 days.

(21) Appl. No.: 13/716,089

(22) Filed: Dec. 15, 2012

(65) Prior Publication Data

US 2013/0154265 A1    Jun. 20, 2013

(30) Foreign Application Priority Data

Dec. 15, 2011    (TW) .............................. 100223673 U

(51) Int. Cl.
| | | |
|---|---|---|
| *B60L 11/12* | (2006.01) | |
| *H02P 9/04* | (2006.01) | |
| *H02J 7/14* | (2006.01) | |
| *G01K 13/00* | (2006.01) | |

(52) U.S. Cl.
CPC ................. *H02J 7/14* (2013.01); *G01K 13/002* (2013.01)
USPC .......................................................... 290/50

(58) Field of Classification Search
CPC ........... G01K 13/002; G01K 7/00; H02J 7/14; H02J 7/32; H02J 15/00
USPC .......................................................... 290/50
See application file for complete search history.

(56) References Cited

U.S. PATENT DOCUMENTS

2007/0058691 A1*    3/2007    Lee ................................ 374/208

FOREIGN PATENT DOCUMENTS

GB            2 396 979          *    7/2004

* cited by examiner

*Primary Examiner* — Javaid Nasri
(74) *Attorney, Agent, or Firm* — Raymond Y. Chan; David and Raymond Patent Firm

(57) ABSTRACT

The invention provides a temperature measuring device with manual power supply which is substantially composed of a casing, a rolling unit, an energy converting unit, an energy storing unit, a temperature measuring unit and a display unit. After rolling or rotating the rolling unit on a plane surface, kinetic energy of the rolling unit is generated and converted to electric power through the energy converting unit and then stored in the energy storing unit. The electric power supplies the needed power to the temperature measuring device and the display unit. Thus, the temperature measuring device with manual power supply of the present invention can be provided with sufficient power at any time.

16 Claims, 2 Drawing Sheets

TEMPERATURE MEASURING DEVICE WITH MANUAL POWER SUPPLY

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

This invention relates to a temperature measuring device, and more particularly, to a temperature measuring device with manual power supply.

2. Description of Related Arts

With the development of scientific and technological progress, various kinds of electronics products are coming out. One problem of these electronics products is that they can not be charged at any time and any where due to several factors. Although charging batteries are provided to the electronics products for extending the usage time period, however, the capacity of the charging batteries is not enough to use.

For thermometer devices, most of them are mercury thermometers in early stages. However, mercury components cause serious environmental pollution. Thus, electronic thermometers are developed for decreasing the mercury pollution. Electronic thermometers are used for measuring temperature of forehead, skin or in the ear through a sensor and display the measuring temperature digitally by a liquid crystal screen. Traditional mercury thermometers are used for showing temperature by thermal expansion and contraction of mercury. Electronic thermometers and batteries are collected together due to the sensors and the liquid crystal screens need a power source for activating. However, the electronic thermometers are used occasionally, perhaps once after a few weeks or a few months. During the time period, batteries may discharge themselves to induce the electric power insufficient below the default working voltage of the electronic thermometers. Therefore, the electronic thermometers can not be used when the situation aforementioned occurs. Meanwhile, it is inconvenient towards users that there are no backup batteries for replacing.

It is desirable, therefore, to provide a sufficient power source for solving problems aforementioned.

SUMMARY OF THE PRESENT INVENTION

One of objects of the present invention is to provide a temperature measuring device with manual power supply for providing a sufficient power source at any time.

To achieve the abovementioned object, the invention provides a temperature measuring device with manual power supply, comprising: a casing; a rolling unit; an energy converting unit disposed in the casing and coupled to the rolling unit; an energy storing unit disposed in the casing and coupled to the energy converting unit; a temperature measuring unit disposed in the casing and coupled to the energy storing unit; and a display unit disposed on the surface of the casing and coupled to the temperature measuring unit; wherein the energy converting unit converts a kinetic energy of the rolling unit to an electric power when the rolling unit is activated, and the electric power is then stored in the energy storing unit for supplying the needed power that the temperature measuring device measures the temperature and the display unit displays the temperature.

According to the temperature measuring device with manual power supply aforementioned, wherein the rolling unit is protruded from the casing or disposed on the casing externally.

According to the temperature measuring device with manual power supply aforementioned, further comprising an opening disposed on the casing and the display unit being fixed in the opening.

According to the temperature measuring device with manual power supply aforementioned, wherein the casing further comprises an extension part and the temperature measuring unit is disposed in the extension part.

According to the temperature measuring device with manual power supply aforementioned, further comprising a gear-change unit coupled between the rolling unit and the energy converting unit.

According to the temperature measuring device with manual power supply aforementioned, wherein the energy converting unit further comprises: two permanent magnets at the opposite sides; an induction coil disposed among the two permanent magnets at the opposite sides; a commutator coupled to the rolling unit for driving the induction coil to rotate, having a first region electrically coupled to one side of the induction coil and a second region insulated to the first region coupled to the other side of the induction coil; a first brush electrically coupled to the first region and the energy storing unit; and a second brush electrically coupled to the second region and the energy storing unit.

According to the temperature measuring device with manual power supply aforementioned, further comprising a gear-change unit coupled between the rolling unit and the energy converting unit for rendering the rotational speed of the rolling unit and that of the induction coil with a linear ratio.

According to the temperature measuring device with manual power supply aforementioned, further comprising a voltage stabilizer coupled between the energy converting unit and the energy storing unit.

According to the temperature measuring device with manual power supply aforementioned, wherein the voltage stabilizer comprises a bridge rectifier having a first terminal and a second terminal electrically coupled to the first brush and the second brush respectively; a third terminal coupled to ground and a fourth terminal electrically coupled to the energy storing unit.

According to the temperature measuring device with manual power supply aforementioned, further comprising a switch and a voltage detecting unit electrically coupled to the energy storing unit; wherein the voltage detecting unit detects a voltage level of the energy storing unit after the switch activated, and disables the energy storing unit when the voltage level lower than a predetermined value.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

The details and technology of the present invention are described below with reference to the accompanying drawings:

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE PREFERRED EMBODIMENT

The principal of the present invention is similar to DC power generator. Both of them supply power and are charged by an induction current generated from an induction coil that is rotating among the permanent magnets according to Ampere right-hand rule. For clarity of disclosure, and not by way of limitation, the detailed description of the invention is divided into the subsections that follow.

Figure 1:
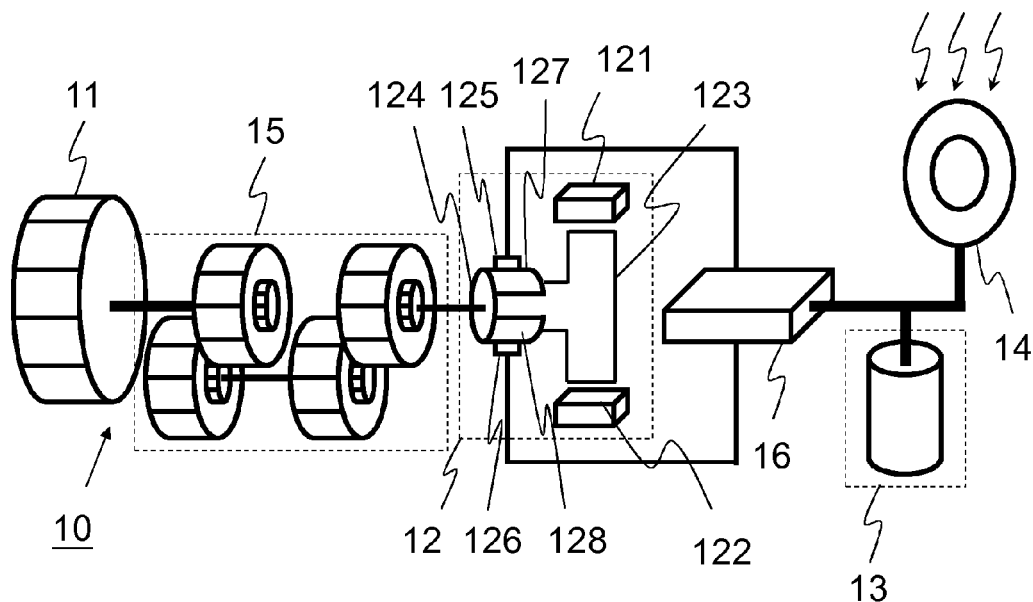
FIG. 1 is a circuit block diagram of temperature measuring device with manual power supply of the present invention.

FIG. 1 is a circuit block diagram of temperature measuring device with manual power supply of the present invention. As shown, the temperature measuring device with manual power supply 10 comprises a casing 20 (shown in FIG. 3), a rolling unit 11, an energy converting unit 12, an energy storing unit 13, a temperature measuring unit 14 and a display unit 22 (shown in FIG. 3). The energy converting unit 12 is disposed in the casing 20 and is coupled to the rolling unit 11. The energy storing unit 13 is disposed in the casing 20 and is coupled to the energy converting unit 12. The temperature measuring unit 14 is disposed in the casing 20 and is coupled to the energy storing unit 13. The display unit 22 is disposed on the surface of the casing 20 and coupled to the temperature measuring unit 14. The energy converting unit 12 converts a kinetic energy of the rolling unit 11 to an electric power when the rolling unit 11 is activated. The electric power is then stored in the energy storing unit 13 for supplying the needed power to the temperature measuring device 14 and the display unit 22.

In FIG. 1, the energy converting unit 12 comprises two permanent magnets 121-122 at the opposite sides, an induction coil 123, a commutator 124, a first brush 125 and a second brush 126. The induction coil 123 is disposed among the two permanent magnets 121-122 at the opposite sides. The commutator 124 is coupled to the rolling unit 11 for driving the induction coil 123 to rotate. The commutator 124 has a first region 127 electrically coupled to one side of the induction coil 123 and a second region 128 insulated to the first region 127 coupled to the other side of the induction coil 123. The first brush 125 is electrically coupled to the first region 127 and the energy storing unit 13. The second brush 126 is electrically coupled to the second region 128 and the energy storing unit 13. So, induction current associated to the two permanent magnets will be generated due to the rolling unit 11 driving the induction coil 123 to rotate. The induction current is then transmitted and stored in the energy storing unit 13 through the first brush 125 and the second brush 126 for follow-up usage.

The temperature measuring device with manual power supply 10 further comprises a gear-change unit 15 coupled between the rolling unit 11 and the energy converting unit 12 for rendering the rotating speed of the rolling unit 11 and that of the induction coil 123 with a linear ratio. Also, the rotating speed of the induction coil 123 can be adjusted faster or slower than the rolling unit's 11 according to requirement. Moreover, the temperature measuring device with manual power supply 10 further comprises a voltage stabilizer 16 coupled between the energy converting unit 12 and the energy storing unit 13 for avoiding circuit damages caused by surge voltage. Besides, the temperature measuring device with manual power supply 10 further comprises a switch 23 (shown in FIG. 3) and a voltage detecting unit (not shown) electrically coupled to the energy storing unit 13. The voltage detecting unit (not shown) detects a voltage level of the energy storing unit 13 after the switch 23 activated, and disables the energy storing unit 13 when the voltage level lower than a predetermined value. This can avoid the condition of mal-operation or detecting inaccurate while the voltage level of the energy storing unit 13 is too low.

Figure 2:
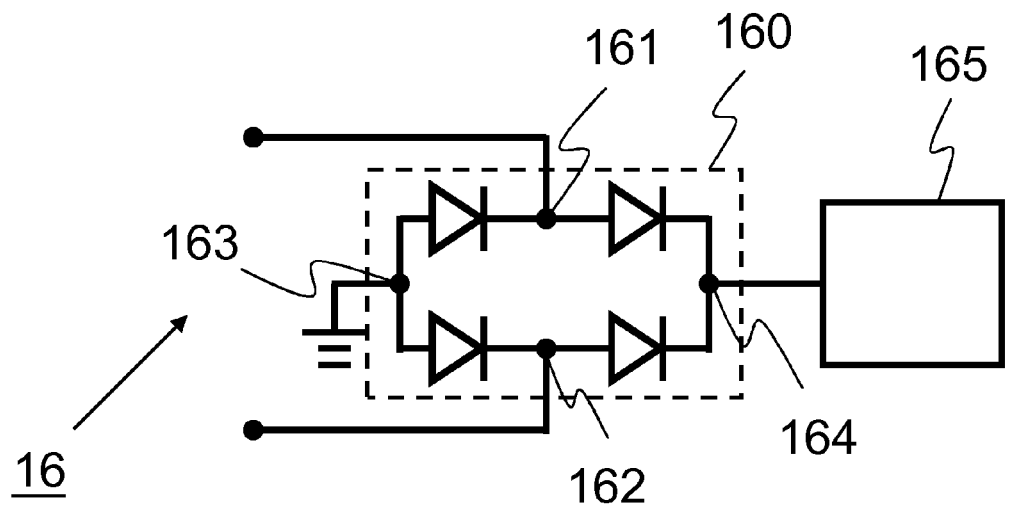
FIG. 2 is a circuit diagram of the voltage stabilizer of the present invention.

FIG. 2 is a circuit diagram of the voltage stabilizer 16 of the present invention. As shown, the function of the voltage stabilizer 16 is for avoiding circuit damages caused by surge voltage and for providing a stable charging current. The voltage stabilizer 16 comprises a bridge rectifier 160 and a RC stabilizing unit 165. The bridge rectifier 160 has a first terminal 161 and a second terminal 162 electrically coupled to the first brush 125 (shown in FIG. 1) and the second brush 126 (shown in FIG. 1) respectively, a third terminal 163 coupled to ground and a fourth terminal 164 electrically coupled to the energy storing unit 13. The RC stabilizing unit 165 is electrically couple between the bridge rectifier 160 and the energy storing unit 13. The bridge rectifier 160 converts the received power to DC power source. The RC stabilizing unit 165 bypasses the momentary unstable DC power source through a capacitor.

Figure 3:
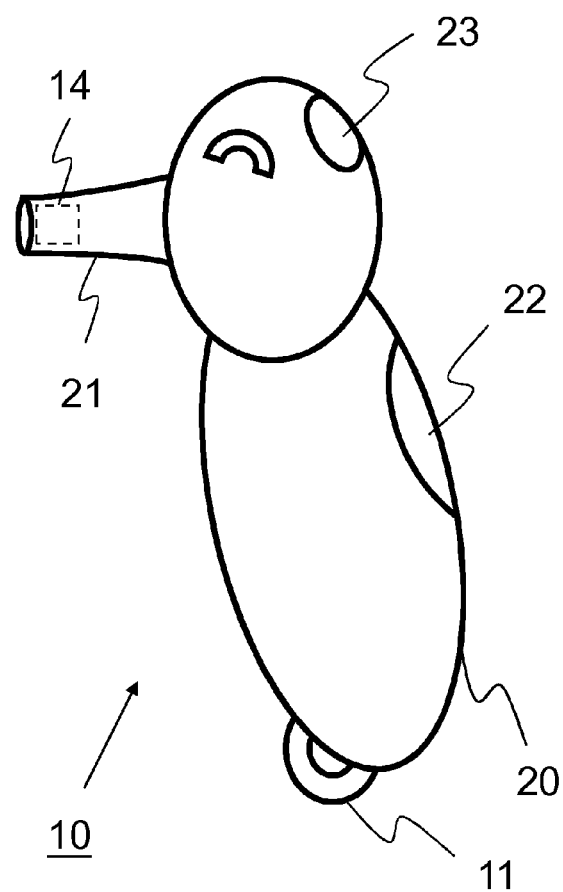
FIG. 3 is an appearance diagram cross section of temperature measuring device with manual power supply of the present invention.

FIG. 3 is an appearance diagram cross section of temperature measuring device with manual power supply of the present invention. As referring to FIG. 1, the temperature measuring device with manual power supply 10 can not be operated normally for measuring temperature when the voltage level of the energy storing unit 13 is insufficient. At the moment, users just push or pull the rolling unit 11 contacting with a flat plane or palm for rotating the rolling unit 11, then the induction coil 123 is driven to rotate and the energy storing unit 13 is charged by the induction current. Till the voltage level of the energy storing unit 13 higher than the predetermined value, the energy storing unit 13 supplies or discharges normally and the temperature measuring device with manual power supply 10 of the present invention can be operated normally. Therefore, a sufficient power source will be provided at any time.

Moreover, the casing 20 of the temperature measuring device with manual power supply 10 further comprises an extension part 21 and the temperature measuring unit 14 is disposed in the extension part 21. Therefore, users can easily use the temperature measuring device with manual power supply 10 to measure ear temperature. Besides, the rolling unit 11 is protruded from the casing 20 or disposed on the casing 20 externally for easily rolling or rotating on the flat plane or palm. The temperature measuring device with manual power supply 10 further comprises an opening (not shown) disposed on the casing 20 and the display unit 22 is fixed in the opening.

Although the present invention has been described in terms of specific exemplary embodiments and examples, it will be appreciated that the embodiments disclosed herein are for illustrative purposes only and various modifications and alterations might be made by those skilled in the art without departing from the spirit and scope of the invention as set forth in the following claims.

What is claimed is:

1. A temperature measuring device, comprising:
   a casing;
   a temperature measuring means comprising a temperature measuring unit disposed at said casing for measuring body temperature; and
   a manual power supply, which comprises:
   a rolling unit rotatable at said casing that said rolling unit is rolled for generating a kinetic energy;
   an energy converting unit disposed in said casing and coupled to said rolling unit, wherein said energy converting unit is arranged for converting said kinetic energy from said rolling unit into an electric power; and
   an energy storing unit disposed in said casing and linked to said energy converting unit for storing said electric power converted by sad energy converting unit as a power supply so as to supply said electric power to said temperature measuring unit.

2. The temperature measuring device, as recited in claim 1, wherein said rolling unit is protruded from said casing or disposed on said casing externally for being rolled in order to generate said kinetic energy.

3. The temperature measuring device, as recited in claim 2, further comprising a gear-change unit coupled between said rolling unit and said energy converting unit for rendering a rotational speed of said rolling unit.

4. The temperature measuring device, as recited in claim 1, wherein said energy converting unit further comprises: two permanent magnets at two opposite sides; an induction coil disposed between said two permanent magnets; a commutator coupled to said rolling unit for driving said induction coil to rotate, having a first region electrically coupled to one side of said induction coil and a second region insulated to said first region coupled to another side of said induction coil; a first brush electrically coupled to said first region and said energy storing unit; and a second brush electrically coupled to said second region and said energy storing unit.

5. The temperature measuring device, as recited in claim 4, further comprising a gear-change unit coupled between said rolling unit and said energy converting unit for rendering a rotational speed of said rolling unit and that of said induction coil with a linear ratio.

6. The temperature measuring device, as recited in claim 5, further comprising a voltage stabilizer coupled between said energy converting unit and said energy storing unit for avoiding circuit damages caused by surge voltage and for providing a stable charging current to said energy storing unit.

7. The temperature measuring device, as recited in claim 6, wherein said voltage stabilizer comprises a bridge rectifier having a first terminal and a second terminal electrically coupled to said first brush and said second brush respectively, a third terminal coupled to ground and a fourth terminal electrically coupled to said energy storing unit.

8. The temperature measuring device, as recited in claim 7, further comprising a switch and a voltage detecting unit electrically coupled to said energy storing unit; wherein said voltage detecting unit detects a voltage level of said energy storing unit after said switch activated, and disables said energy storing unit when said voltage level lower than a predetermined value.

9. The temperature measuring device, as recited in claim 8, wherein said temperature measuring means further comprises a display unit provided on a surface of said casing for displaying said body temperature measured by said temperature measuring unit.

10. The temperature measuring device, as recited in claim 9, wherein said casing has an opening and an extension part that said display unit is provided at said opening of said casing and said temperature measuring unit is disposed at said extension part of said casing.

11. The temperature measuring device, as recited in claim 4, further comprising a voltage stabilizer coupled between said energy converting unit and said energy storing unit for avoiding circuit damages caused by surge voltage and for providing a stable charging current to said energy storing unit.

12. The temperature measuring device, as recited in claim 11, wherein said voltage stabilizer comprises a bridge rectifier having a first terminal and a second terminal electrically coupled to said first brush and said second brush respectively, a third terminal coupled to ground and a fourth terminal electrically coupled to said energy storing unit.

13. The temperature measuring device, as recited in claim 1, further comprising a gear-change unit coupled between said rolling unit and said energy converting unit for rendering a rotational speed of said rolling unit.

14. The temperature measuring device, as recited in claim 1, further comprising a switch and a voltage detecting unit electrically coupled to said energy storing unit; wherein said voltage detecting unit detects a voltage level of said energy storing unit after said switch activated, and disables said energy storing unit when said voltage level lower than a predetermined value.

15. The temperature measuring device, as recited in claim 1, wherein said temperature measuring means further comprises a display unit provided on a surface of said casing for displaying said body temperature measured by said temperature measuring unit.

16. The temperature measuring device, as recited in claim 15, wherein said casing has an opening and an extension part that said display unit is provided at said opening of said casing and said temperature measuring unit is disposed at said extension part of said casing.

* * * * *